US009880011B2

(12) United States Patent
Ding et al.

(10) Patent No.: US 9,880,011 B2
(45) Date of Patent: Jan. 30, 2018

(54) SIMPLIFICATION OF TRAJECTORY REPRESENTATION

(71) Applicant: International Business Machines Corporation, Armonk, NY (US)

(72) Inventors: Jian Dong Ding, Shanghai (CN); Ning Duan, Beijing (CN); Guoqiang Hu, Shanghai (CN); Peng Ji, Nanjing (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 14/814,557

(22) Filed: Jul. 31, 2015

(65) Prior Publication Data

US 2017/0030723 A1 Feb. 2, 2017

(51) Int. Cl.
*G01C 21/32* (2006.01)
*G06F 17/30* (2006.01)
*G09B 29/10* (2006.01)

(52) U.S. Cl.
CPC ....... *G01C 21/32* (2013.01); *G06F 17/30241* (2013.01); *G09B 29/106* (2013.01)

(58) Field of Classification Search
CPC combination set(s) only.
See application file for complete search history.

(56) References Cited

U.S. PATENT DOCUMENTS

| 6,636,802 B1* | 10/2003 | Nakano | G01C 21/32 |
| | | | 701/532 |
| 7,657,372 B2* | 2/2010 | Adachi | G06Q 10/047 |
| | | | 340/995.14 |
| 7,890,252 B2* | 2/2011 | Sekine | G01C 21/3446 |
| | | | 701/428 |
| 8,386,168 B2* | 2/2013 | Hao | G08G 1/0104 |
| | | | 701/411 |
| 9,177,479 B2 | 11/2015 | Castillo-Effen et al. | |
| 2005/0058155 A1* | 3/2005 | Mikuriya | H04Q 3/0062 |
| | | | 370/474 |
| 2007/0211732 A1* | 9/2007 | Suemura | H04L 45/28 |
| | | | 370/400 |
| 2008/0091344 A1* | 4/2008 | Mikuriya | G06F 17/30241 |
| | | | 701/450 |
| 2009/0088973 A1* | 4/2009 | Watkins | G01C 21/3691 |
| | | | 701/469 |
| 2010/0235083 A1* | 9/2010 | Takahata | G01C 21/32 |
| | | | 701/533 |

(Continued)

FOREIGN PATENT DOCUMENTS

CN          103020222 A          4/2013

OTHER PUBLICATIONS

Bogorny et al., "A Conceptual Data Model for Trajectory Data Mining", GIScience 2010, LNCS 6292, pp. 1-15, © Springer-Verlag Berlin Heidelberg 2010.

(Continued)

*Primary Examiner* — Hussein Elchanti
(74) *Attorney, Agent, or Firm* — Daniel R. Simek

(57) ABSTRACT

Simplification of trajectory representation is provided. Trajectories represented by a set of points on a map are obtained. Common route elements are identified for the trajectories based on the set of points. Each of the common route elements represents a geospatial area in which at least a predetermined number of the trajectories are identical. Simplified representations of the trajectories are generated based on the identified common route elements.

18 Claims, 7 Drawing Sheets

(56) References Cited

U.S. PATENT DOCUMENTS

| | | |
|---|---|---|
| 2011/0164527 A1* | 7/2011 | Mishra .................. H04L 45/123 370/252 |
| 2011/0301832 A1 | 12/2011 | Zheng et al. |
| 2014/0149070 A1 | 5/2014 | Cheng et al. |
| 2014/0164389 A1 | 6/2014 | Hampapur et al. |
| 2015/0039217 A1 | 2/2015 | Deshpande et al. |
| 2017/0131110 A1 | 5/2017 | Zheng et al. |

OTHER PUBLICATIONS

Cao et al., "Mining Frequent Spatio-temporal Sequential Patterns", The University of Hong Kong, Pokfulam Road, Hong Kong, Proceedings of the Fifth IEEE International Conference on Data Mining (ICDM'05), IEEE Computer Society, Department of Computer Science, © 2005 IEEE, pp. 1-8.

Giannotti et al., "Trajectory Pattern Mining", Research Track Paper, KDD'07, Aug. 12-15, 2007, San Jose, California, USA, Copyright 2007 ACM 978-1-59593-609-7/07/0008, pp. 330-339.

Jung et al., "A Sequence Pattern Matching Approach to Shopping Path Clustering", Proceedings of the 2012 International Conference on Industrial Engineering and Operations Management, Istanbul, Turkey, Jul. 3-6, 2012, pp. 2364-2372.

King et al., "Efficient Data Collection and Event Boundary Detection in Wireless Sensor Networks Using Tiny Models", Geosensor Networks Laboratory, Department of Spatial Information Science and Engineering, University of Maine, Orono Maine, United States 04469-5711, GIScience 2010, LNCS 6292, pp. 100-114, © Springer-Verlag Berlin Heidelberg 2010.

Seki et al., "Parallel Distributed Trajectory Pattern Mining Using Hierarchical Grid with MapReduce", International Journal of Grid and High Performance Computing, 5(4), 79-96, Oct.-Dec. 2013, pp. 79-80, Copyright © 2013, IGI Global, DOI: 10.4018/ijghpc. 2013100106.

Wang et al., "Frequent Spatiotemporal Trajectory Pattern Mining Based on Pheromone Concentration", Journal of Information and Computational Science, Issued Date: 2013, vol. 10, Issue: 3, pp. 645-658, Copyright © 2013 Binary Information Press, Feb. 10, 2013.

* cited by examiner

SIMPLIFICATION OF TRAJECTORY REPRESENTATION

TECHNICAL FIELD

The present invention relates generally to the field of trajectory representation and, more particularly, to simplification of trajectory representation.

BACKGROUND OF THE INVENTION

A trajectory pattern refers to data describing the characteristics of trajectories between given locations or in a certain shape. For example, given two points on the map, a trajectory pattern may indicate the route segments that are frequently passed by the trajectories between those two points. The trajectory patterns are widely used in many map-based applications such as carpooling in the industry of transport/social-network, route monitoring and recommendation in logistics industry, driving risk assessment in insurance industry, and the like.

Manual identification of trajectory patterns is a time consuming and error-prone process with relatively low precision. In order to automate the identification of trajectory patterns, it is necessary to process the huge amount of trajectory data. In general, a trajectory is determined based on the data acquired by mobile sensors as Global Positioning System (GPS) receivers. In many applications, the mobile sensors generate continuous data and stream the data to backend servers at very high sampling rates. The data streams featured with intensive spatial and/or temporal trajectory information require considerable computation resource for subsequent data processing and analysis such as the pattern mining. It is found that the massive sampling data leads to intolerable processing time in the processes such as clustering of trajectories. In addition, the huge amount of data representing the trajectories data is a bottleneck in many other applications.

SUMMARY

According to one embodiment of the present invention, a method for simplification of trajectory representation is provided. The method includes: obtaining, by one or more processors, trajectories represented by a set of points on a map; identifying, by one or more processors, common route elements for the trajectories based on the set of points, each of the common route elements representing a geospatial area in which at least a predetermined number of the trajectories are identical; and generating, by one or more processors, simplified representations of the trajectories based on the identified common route elements.

According to another embodiment of the present invention, a computer program product for simplification of trajectory representation is provided. The computer program product comprises a computer readable storage medium and program instructions stored on the computer readable storage medium. The program instructions include: program instructions to obtain trajectories represented by a set of points on a map; program instructions to identify common route elements for the trajectories based on the set of points, each of the common route elements representing a geospatial area in which at least a predetermined number of the trajectories are identical; and program instructions to generate simplified representations of the trajectories based on the identified common route elements.

According to another embodiment of the present invention, a computer system for simplification of trajectory representation is provided. The computer system includes one or more computer processors, one or more computer readable storage media, and program instructions stored on the computer readable storage media for execution by at least one of the one or more processors. The program instructions include: program instructions to obtain trajectories represented by a set of points on a map; program instructions to identify common route elements for the trajectories based on the set of points, each of the common route elements representing a geospatial area in which at least a predetermined number of the trajectories are identical; and program instructions to generate simplified representations of the trajectories based on the identified common route elements.

DETAILED DESCRIPTION

In general, example embodiments of the present invention include a method, device and computer program product for trajectory processing.

In some embodiments of the present invention, input trajectories are represented by a set of points on a map. Common route elements for the trajectories are identified based on the set of points, where each of the common route elements represents a geospatial area in which at least a predetermined number of the trajectories are identical. Simplified representations of the trajectories are generated based on the identified common route elements.

Aspects of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Embodiments of the present invention recognize that a major challenge in large-scale trajectory pattern mining lies in the processing of the massive data of points (for example, the GPS points) representing the trajectories, which leads to the high processing time of pattern mining. In some embodiments, frequent or common route elements are extracted from a set of trajectories. Further, the trajectories may be transformed to simpler trajectories represented by sequences of the extracted common route elements. The subsequent data processing and analysis such as the pattern mining may be performed on the transformed representations of the trajectories. In some embodiments, this approach significantly reduces the computational overhead of data processing.

Figure 1:
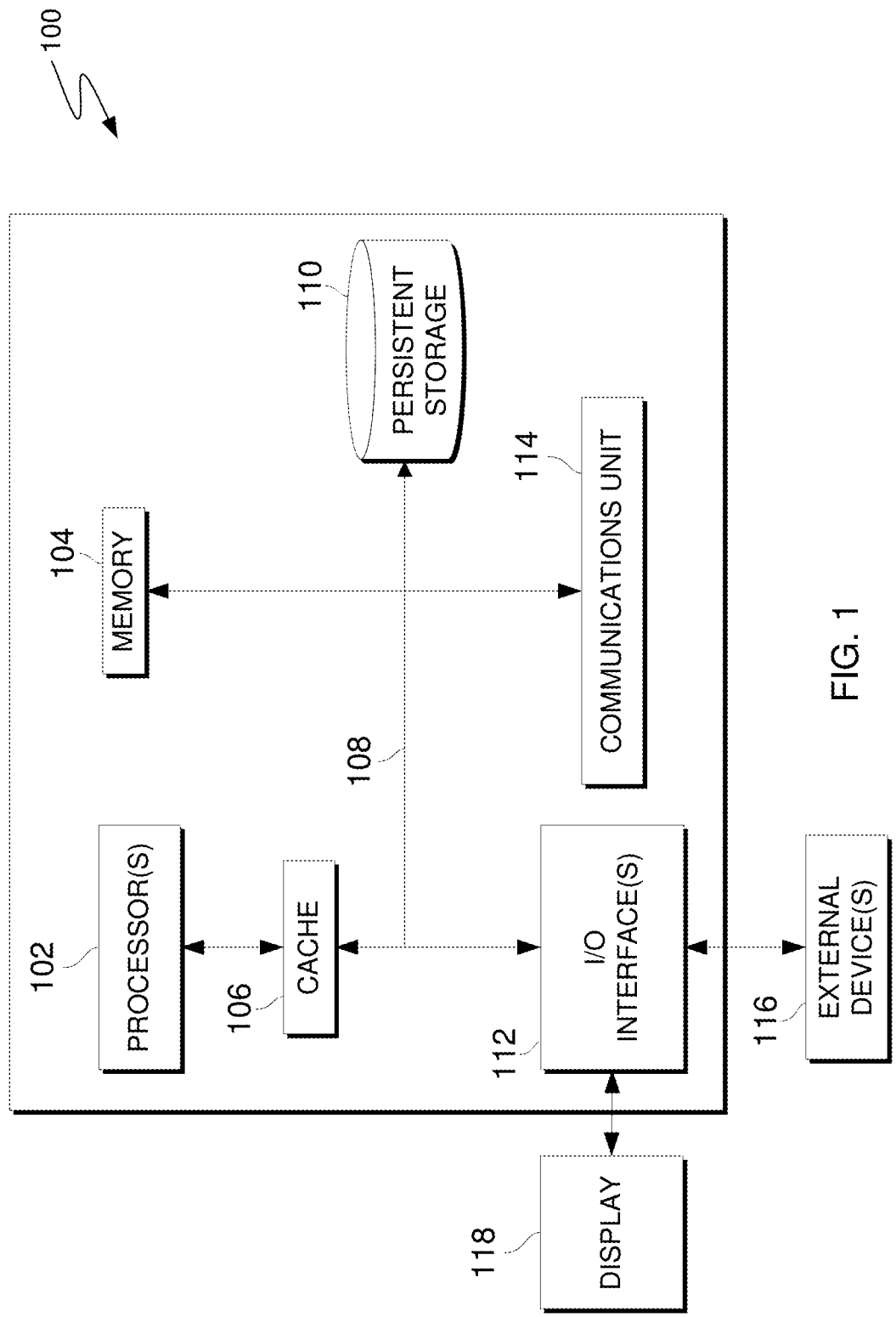
FIG. 1 is a block diagram of components of a computing device by which embodiments of the present invention can be implemented for executing operations for simplification of trajectory representation.
Figure 2:
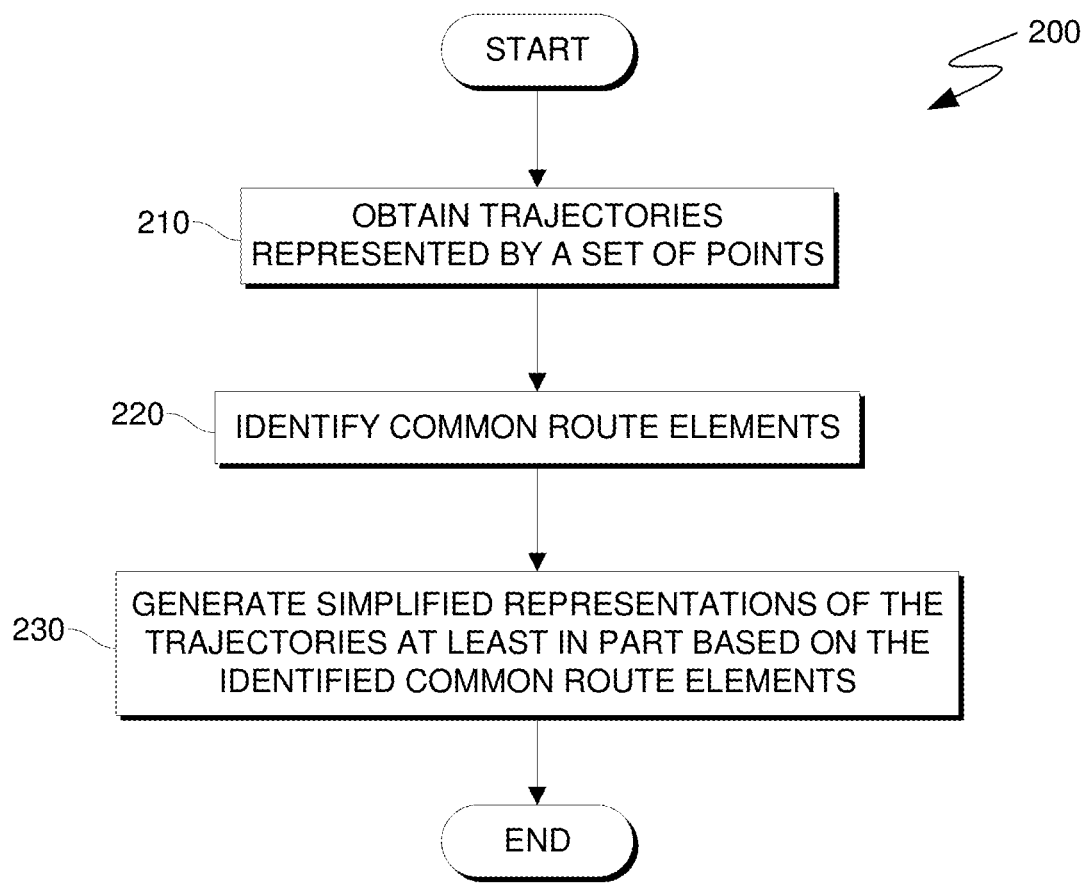
FIG. 2 is a flowchart depicting operations for trajectory processing, in accordance with an embodiment of the present invention.

FIG. 2 shows the flowchart of a method 200 for trajectory processing in accordance with example embodiments of the present invention. As shown, the method 200 is entered in step 210, where the trajectories to be processed are obtained. Each trajectory is initially represented by a series of points on a map. The points are acquired over time and each point is corresponding to a real-word location.

In accordance with embodiments of the present invention, the points representing a trajectory may be obtained in any suitable ways. For example, one or more traveling entities may periodically or continuously sample location data and transmit the data to one or more backend servers. As used herein, an entity may refer to any object or device capable of sensing or otherwise acquiring location data. Examples of an entity include, but are not limited to, a vehicle, a motorcycle, a person who is moving, and the like. An entity may include and/or carry a location sensing device(s) to obtain the location data. Examples of a location sensing device include, but are not limited to, a GPS receiver, a Galileo positioning system receiver, and the like. The location data may include altitudes and latitudes of respective locations, for example. Optionally, the location data may include time, velocity, direction or any other relevant spatial and/or temporal information. At the backend server(s), the raw location data may be processed and mapped onto a map as a series points representing the trajectories. These points may be stored in any suitable forms, for example, in database tables, Extensible Markup Language (XML) files and the like and can be retrieved in step 210.

The method 200 then proceeds to step 220. In step 220, the common route elements for the trajectories are identified based on the set of points representing the trajectories. As used herein, the term "common route element" refers to a geospatial area in which at least a predetermined number of the trajectories are identical to each other. That is, if the number of trajectories that are identical within a geospatial area is equal to or greater than the predetermined number, the route element corresponding to this geospatial area may be identified as a common route element. The threshold number may be determined according to the accuracy requirements or specification, statistics, experiences, and/or any other criteria.

Figure 3:
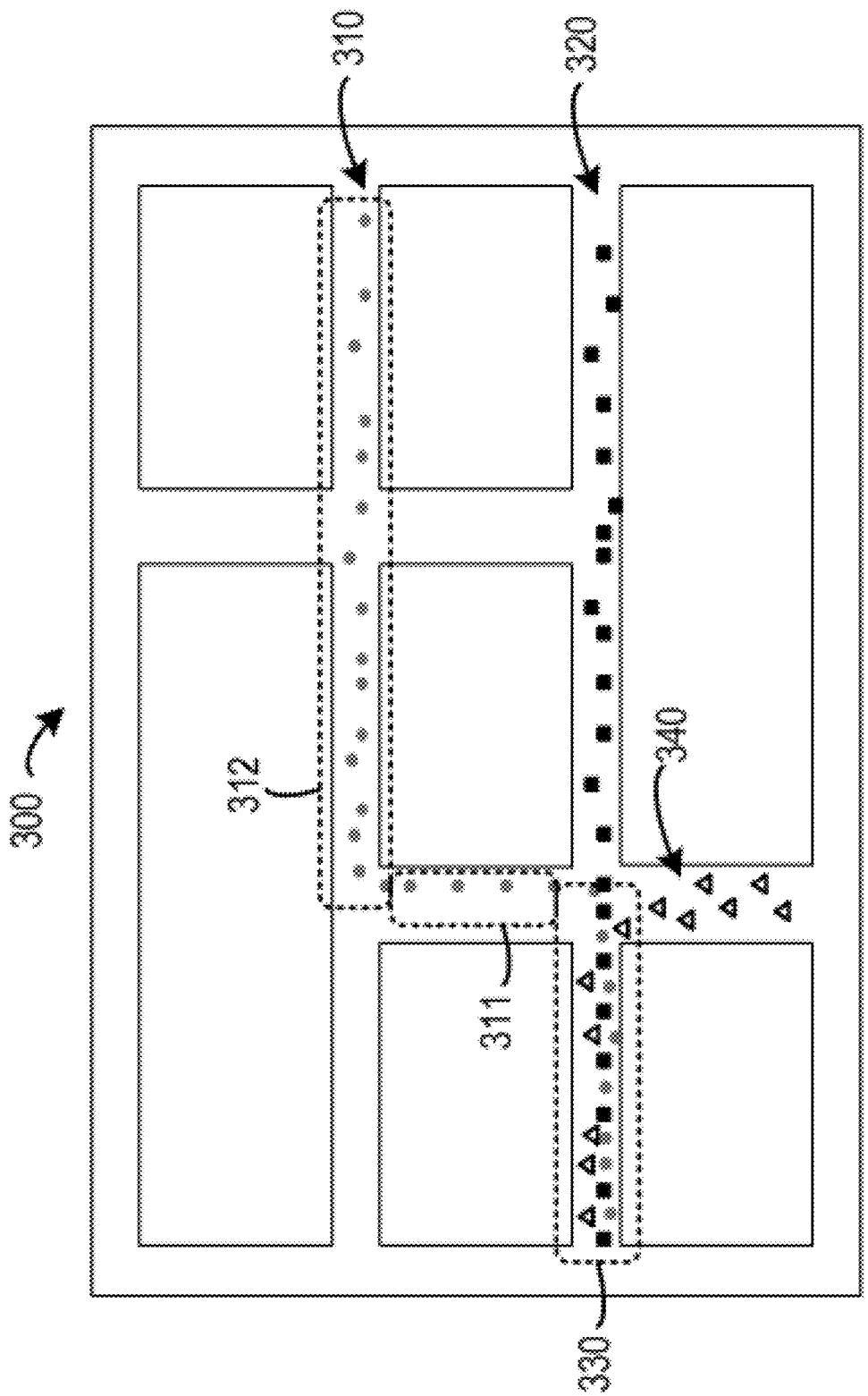
FIG. 3 is a schematic diagram of trajectories and route elements, in accordance with an embodiment of the present invention.

By way of example, FIG. 3 shows a schematic diagram of two trajectories and their common route element. The map 300 shown in FIG. 3 includes trajectory 310 and trajectory 320, each of which is represented by a respective series of points, as described above. In FIG. 3, the points in the trajectory 310 are shown as circles while the points in the trajectory 320 are shown as squares. Only for the purpose of discussion, it is assumed that the threshold number is two in this case. It is to be understood that any other suitable threshold value can be used as well. It can be seen from FIG. 3 that the trajectories 310 and 320 both pass through a route element 330. That is, in the route element 330, the trajectories 310 and 320 are identical to one another. As a result, the route element 330 may be identified as a common route element.

In this example, the common route element 330 is a route segment. This is only an example, without suggesting any limitation as to the scope of the present invention. A common route element may be a geospatial area of any shape factor. For example, in some embodiments, an intersection of multiple routes may act as a common route element.

In implementation, the common route elements (for example, the route element 330 in FIG. 3) may be identified in various ways. For example, in one embodiment, it is possible to identify the common route element by point tracking and aggregation. For the purpose of discussion, reference is still made to the example shown in FIG. 3. Given a first point from the trajectory 310 and a second point from the trajectory 320, their matching degree may be determined. For example, the matching degree can be measured by the distance between the points. If the distance between the first and second points is below a threshold distance, then the first and second points make a match.

The point tracking is performed according to the adjacency of the points along the trajectory direction. More specifically, starting from the first and second points, it can be determined whether a point from the trajectory 310 adjacent to the first point matches a point from the trajectory 320 adjacent to the second point. If so, the tracking continues from the newly detected matching points. This is repeatedly performed in one or more directions, depending on the point adjacency, until a pair of unmatched points is detected. The route element that covers the matching points from the trajectories 310 and 320 is identified as a common route element. In this way, one or more common route elements may be determined.

Alternatively, or in addition, the information about the route network, traffic, administrative layout, population and/or any other aspects can be taken into consideration in the identification of common route elements. For example, in one embodiment, if it is determined based on the route network that two points on the map are only connected by a single route segment, this route segment may be identified as a common route element for all the trajectories passing through those two points. As another example, in one embodiment, if a geospatial area is specified as a hot-sport area such as a dense business or commercial district, then one or more route element related to this area may be identified as common route elements. In yet another embodiment, the user is allowed to specify one or more common route elements, for example.

In accordance with embodiments of the present invention, the common route elements may be represented in any suitable way. For example, a common route element may be represented by its start point and end point. If a common route element is exactly corresponding to a geospatial area such as a route segment in the rout network, this common route element may be represented by an identifier and/or name of the geospatial area. Alternatively, or in addition, in some embodiments, the map may be partitioned into a plurality of grids in order to better control the accuracy and granularity of processing. In such embodiments, the common route elements may be identified and represented on the basis of grids. Example embodiments in this regard will be described in the following paragraphs.

It is possible that a trajectory or a portion thereof cannot be covered by the common route elements. An individual route element(s) may be generated to represent such a trajectory portion. As used herein, an individual route element refers to a geospatial area in which less than the threshold number of the trajectories are identical. For example, in the example shown in FIG. 3, two individual route elements 311 and 312 are generated for the trajectory 310 because only the trajectory 310 passes through these areas. That is, the geospatial areas covered by the individual route elements 311 and 312 cannot be covered by the common route elements. Similar to the common route element, an individual route element may be represented by its start and end points, the identifier/name of the corresponding geospatial area in the route network, the map grids, or the like.

In the above embodiments, each trajectory is represented by common route elements and/or individual route elements. That is, if a portion of the trajectory cannot be represented by a common route element, then an individual route element is generated to represent that portion. However, it is to be understood that the individual route elements are not necessarily required. For example, in an alternative embodiment, if a portion of a trajectory is not covered by any common route element, the initial point-based representations for the portion may be maintained.

Still in reference to FIG. 2, the method 200 then proceeds to step 230 where the simplified representations of the trajectories are generated at least in part based on the common route elements identified in step 220. As described above, the initial trajectories obtained in step 210 are represented by a set of points on the map. In step 230, the initial point-based representations of the trajectories are transformed into the simplified representations based on the route elements to reduce the data amount.

In some embodiments, each trajectory may be represented entirely based on the route elements. As discussed above, an individual route element may be generated to represent a trajectory portion that cannot be covered by any common route element. In such embodiments, the trajectory may be represented by a series of common route elements and/or individual route elements. For example, in the example shown in FIG. 3, the simplified representation of the trajectory 310 includes the common route element 330 and the individual route elements 311 and 312.

Alternatively, in those embodiments where the point-based representation may be maintained for the trajectory portions that cannot be covered by the common route elements, the hybrid representations may be generated in step 230. That is, the simplified representation of a trajectory may include one or more common route elements and a series of points.

With the method 200, the original point-based representation of the trajectories may be simplified by use of the route elements. Since each common route element is a frequent one shared by a plurality of trajectories, the simplified representations of the trajectories can significantly reduce the amount of data to be processed in the subsequent processes (for example, the trajectory pattern mining). For example, conventional trajectory pattern mining approaches usually apply clustering process directly on the trajectory points to find the most frequent route segments between a departure point and a destination point. On the contrary, in accordance with embodiments of the present invention, the trajectory pattern may be learned by clustering the route elements (common route elements and/or individual route elements) rather than the points. In this way, the convergence can be achieved more quickly, thereby reducing the computational costs.

Figure 4:
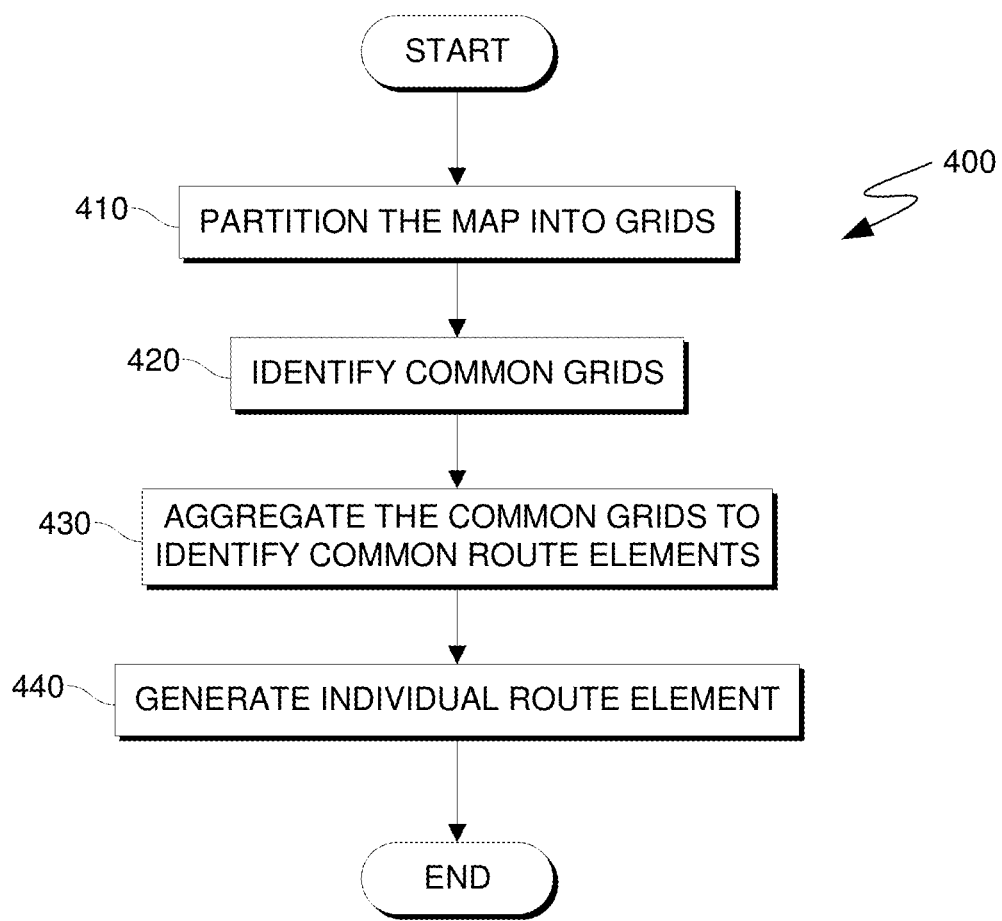
FIG. 4 is a flowchart depicting operations for trajectory processing based on map gridding, in accordance with an embodiment of the present invention.

As described above, in some embodiments, the map may be partitioned into a plurality of grids in order to better control the accuracy and granularity of processing. In such embodiments, the common route elements may be identified and represented on the basis of grids. Some example embodiments will now be discussed. FIG. 4 shows the flowchart of a method 400 for identifying common route elements based on map gridding in accordance with example embodiments of the present invention. The method 400 can be considered as an example implementation of step 220 in the method 200 as described with reference to FIG. 2.

Figure 5A:
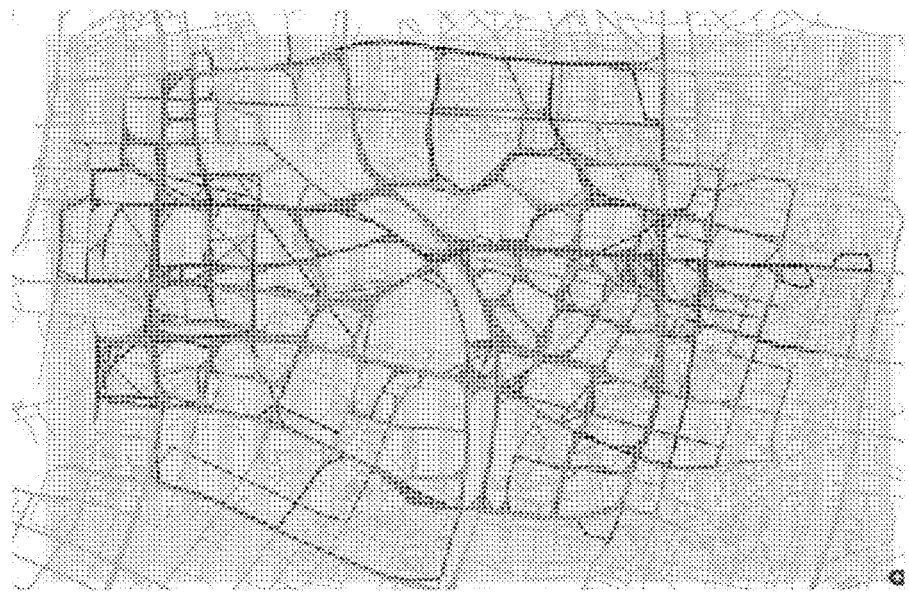
FIG. 5A is a schematic diagram of map gridding, in accordance with an embodiment of the present invention.

As shown, the method 400 is entered in step 410, where the map is partitioned into a plurality of grids. In some embodiment, the partitioning of the map may be done according to the accuracy requirement or specification. Generally speaking, if the required accuracy is relatively high, then the size of grids may be set smaller, vice versa. For example, it is assumed that the spatial accuracy specification is 100 m for a map covering an area of about 75 km$^2$. In this example, the map may be partitioned by a grid structure with each grid of size 50*50 m (over 15000 grids), as shown in FIG. 5A. By selecting the size of grids according to the accuracy requirements, embodiments of the present invention allow the trajectory processing with adaptive granularity.

Each of the trajectories to be processed may be represented by a subset of the grids obtained in step 410. For a trajectory, if one or more points on the trajectory fall into a grid, then the grid will be identified as being associated with that trajectory. All the grids associated with a trajectory are arranged in sequence to form the grid-based representation of the trajectory. It would be appreciated that by transforming the point-based representation into grid-based representation, the data amount has already been reduced in this step.

Next, in step 420, the common grids are identified from the plurality of grids. As used herein, a "common grid" refers to a grid that at least covers the threshold number of trajectories. That is, if the trajectories of the threshold number or more pass through a grid, then the grid is identified as a common grid. As described above, the threshold number may be determined in advance according to the accuracy requirements, statistics, experiences, and/or any other criteria.

The identification of the common grids may be done at least in part based on the trajectory popularity or hot degree of the grids. As used herein, the trajectory popularity of a grid refers to the number of trajectories that pass through the grid. If the trajectory popularity of the grid exceeds the threshold number, the grid is identified as a common grid. Alternatively, or in addition, the common grids may be determined based on information about other relevant factors, including, but is not limited to, the route network, traffic, administrative layout, and the like, as described above. In yet another example, one or more common grids may be specified by a user.

The method 400 then proceeds to step 430 where the common route elements are identified by aggregating the common grids identified in step 420. The aggregation may be performed based on the adjacency of the grids. As used herein, the "adjacency" of grids refers to the positional neighboring relations of the grids. For example, if a grid is within the four-connected or eight-connected region of another grid, then these two grids are adjacent to one another. It would be appreciated that a common grid may have one or more adjacent grids. Starting from a common grid, it is determined whether its adjacent grid(s) is also a common grid. If so, the tracking will be continued to determine whether this adjacent common grid has a further adjacent common grid, and so forth. The grid tracking may be performed in one or more directions, depending on the adjacency of the grids, until an uncommon adjacent grid is detected. In this way, one or more sets of continuous common grids may be obtained. Each set of continuous common grids forms a common route element.

In some embodiments, some post-processing may be applied on the obtained common route elements. For example, in one embodiment, a connection process may be applied on the common route elements obtained in step 430. More particularly, it would be appreciated that each common route element has two end grids, namely, the first grid and the last grid. In one embodiment, if the distance between one of the end grids of a first common route element and one of the end grids of a second common route element is below a threshold distance, then the first and second common route elements may be connected to form a new common route element, for example. The connection can be done by including the grids between the adjacent end grids of the first and second common route elements. This is just an example without suggesting any limitation as to the scope of the present invention. Any other post-processing is possible as well.

In some embodiments, the method 400 may proceed to step 440 where individual route elements are generated to represent the trajectories or the portions thereof (if any) that cannot be covered by the common route elements. Similar to the common route elements, in such embodiments, an individual route element may be represented as a set of continues grids. Of course, as described above, the generation of individual route elements is not necessarily required and step 440 can be omitted in some embodiments.

Figure 5B:
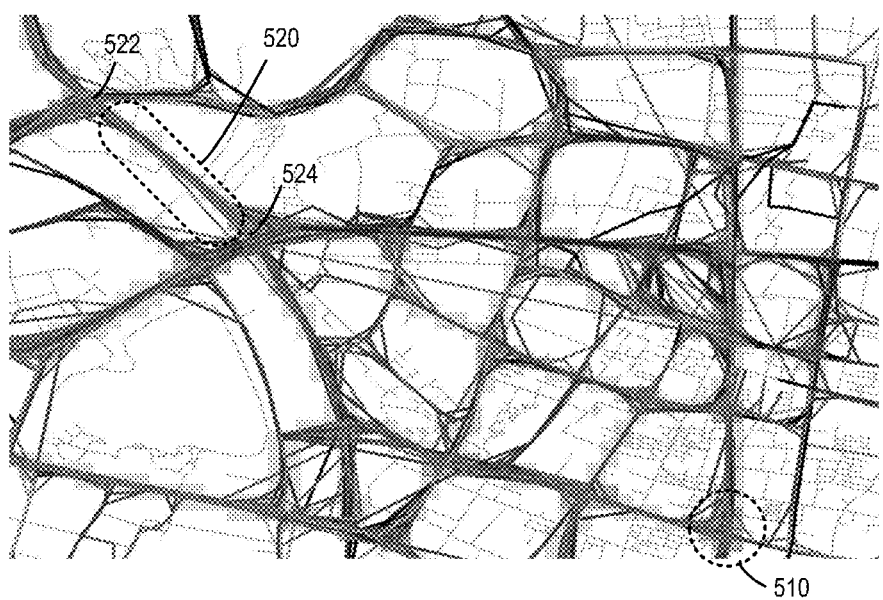
FIG. 5B is a schematic diagram of the common route elements that are obtained based on the map gridding, in accordance with embodiments of the present invention.

FIG. 5B shows example common route elements that are obtained by the method 400 based on the map gridding as shown in FIG. 5A. In the shown example, the common route element 510 composed of a set of common grids corresponds to an intersection on the map. The common route element 520 corresponds to the route segment connecting the points 522 and 524. By identifying and using the grid-based common route elements in the processing such as trajectory pattern mining, efficiency of the processing can be significantly improved.

It would be appreciated that the trajectories may vary. For example, one or more trajectories may be added over time. In some embodiments, the common route elements and may be dynamically updated to reflect such change of trajectories. Then, based on the updated common route elements, the simplified representations of the trajectories may be updated.

In some embodiments, once a new trajectory is input, the process as described with reference to FIG. 2 may be performed to update the route elements. Alternatively, in other embodiments, the update may be achieved in an incremental way, in order to avoid heavy computational overhead. That is, for a new trajectory, if a portion(s) or segment(s) of the new trajectory can be covered by one or more existing common route elements, then the existing common route elements may be directly reused to represent the portion of the new trajectory. On the other hand, if a portion of the new trajectory cannot be covered by any common route element that has been identified, then a common route element may be generated. In some embodiments, it is first attempted to generate a new common route element to represent such a portion. If that fails, a new individual route element may be then generated.

For instance, FIG. 3 shows a new trajectory 340 composed of a set of points that are shown as triangles in the figure. Only for the purpose of illustration, the new trajectory 340 in this example includes a substantially horizontal portion and a substantially vertical portion. It can be seen that the horizontal portion of the new trajectory 340 falls within the existing common route element 330. Accordingly, this horizontal portion may be represented by the common route element 330. The vertical portion of the new trajectory 340, however, cannot be represented by any existing common route element. At this point, in one embodiment, it is determined whether this vertical portion is identical to one or more portions of other existing and/or new trajectories. If so, a new common route element may be generated. Otherwise, an individual route element may be generated to represent the vertical portion of the new trajectory 340.

Figure 6:
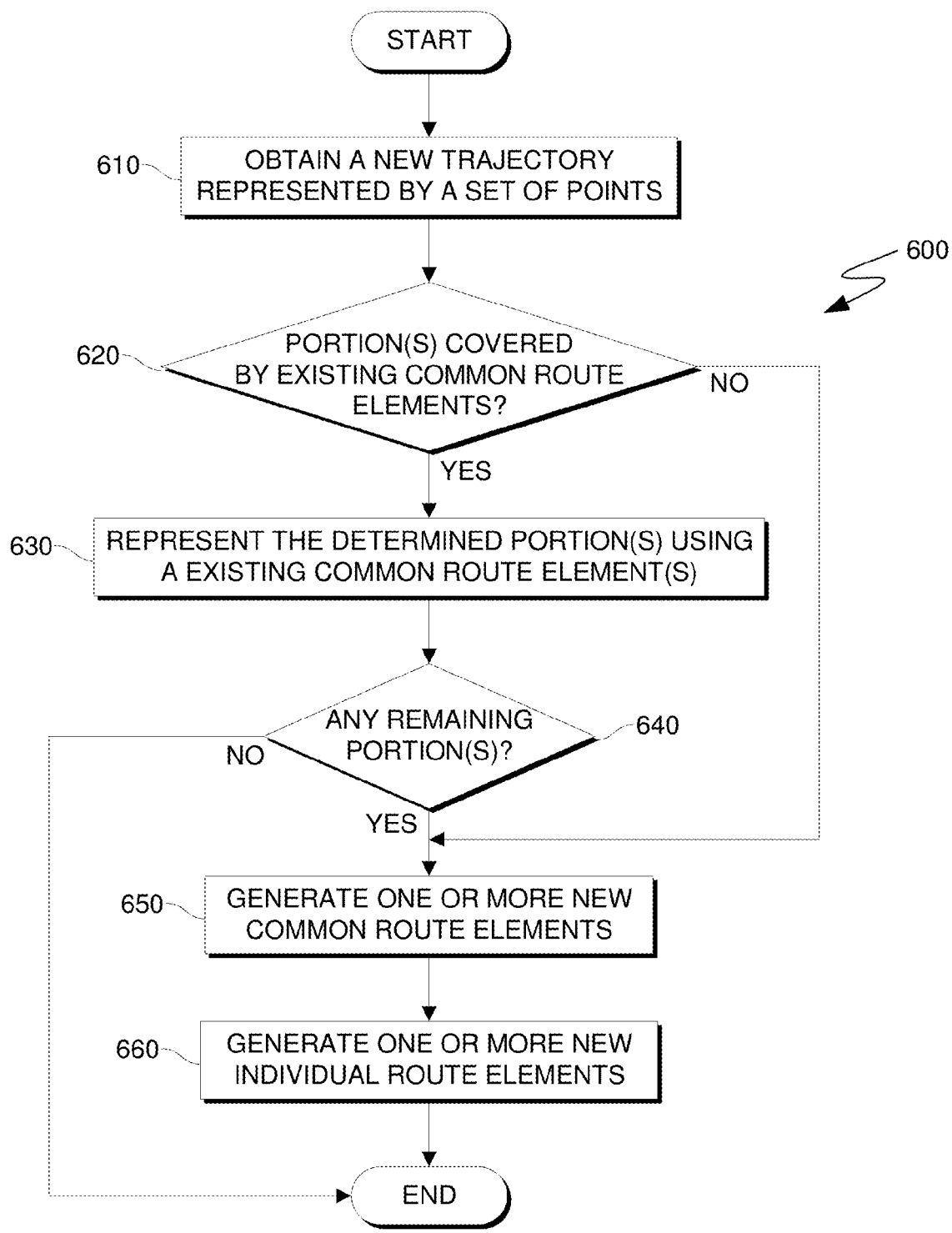
FIG. 6 is a flowchart depicting operations for incrementally updating the common route elements in response to the addition of a new trajectory, in accordance with an embodiment of the present invention.

FIG. 6 shows the flowchart of a method 600 for incrementally updating the common route elements in response to the addition of a new trajectory in accordance with embodiments of the present invention. The method 600 is entered in step 610, where a new trajectory is obtained. The new trajectory is also represented by a set of points on the map.

In step 620, it is determined whether the new trajectory contains one or more portions that can be covered by one or more existing common route elements. Given a portion of the new trajectory, in step 620, it is possible to determine whether the grids covering the portion are included in a common route element(s). If there is such a portion, the method 600 proceeds to step 630 where the portion determined in step 620 is directly represented by one or more existing common route element. For instance, with reference to the example shown in FIG. 5B, if the new trajectory contains the route segment from the point 522 to point 524, then this portion may be directly represented by the common route element 520. On the other hand, if it is determined in step 620 that no portion in the new trajectory can be covered by the existing common route element, the method 600 proceeds to step 650 which will be discussed in the following paragraphs.

After step 630, the method 600 proceeds to step 640 where it is determined whether the new trajectory includes any remaining portion that cannot be covered by any existing common route elements. If so, the method 600 proceeds to step 650 to try to generate a new common route element that covers the portion(s) of the new trajectory that cannot be covered by existing common route elements. Otherwise, if it is determined in step 640 that the entire new trajectory has been represented by the existing common route elements, the method 600 may terminate (not shown in the figure).

Only for the purpose of illustration, reference is still made to those embodiments where the map is partitioned into grids. In step 650, a process similar to the one as described above with reference to FIG. 4 may be performed to create one or more new common route element. More specifically, for a portion to be processed, it is determined whether the portion contains one or more common grids, for example, based on the trajectory popularity of the grids. Then the detected common grids (if any) may be tracked and aggregated to construct a new common route element(s). In one embodiment, the tracking and aggregation may involve not only the new common grids but also the nearby exiting common grids. In this way, the incremental update of the common route elements is achieved.

In some embodiments, the method 600 proceeds to step 660 to create an individual route elements for each portion of the new trajectory that cannot be represented by either the existing common route elements or new common route elements. As described above, step 660 can be omitted in some embodiments.

Figure 7:
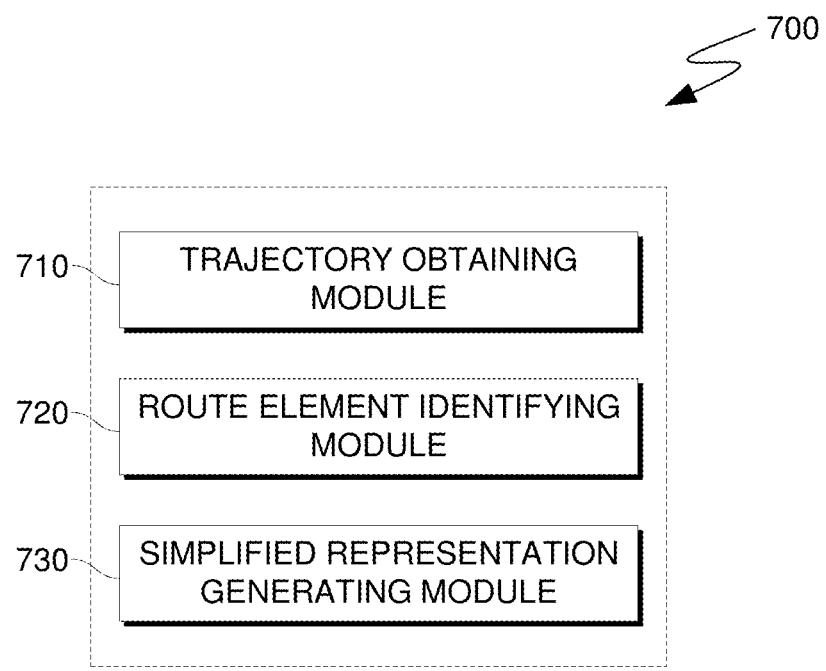
FIG. 7 is a functional block diagram of a device, in accordance with an embodiment of the present invention.

FIG. 7 is a block diagram of a device 700 in accordance with embodiments of the present invention. As shown, the device 700 comprises a trajectory obtaining module 710 configured to obtain trajectories represented by a set of points on a map; a route element identifying module 720 configured to identify common route elements for the trajectories based on the set of points, each of the common route elements representing a geo spatial area in which at least a predetermined number of the trajectories are identical; and a simplified representation generating module 730 configured to generate simplified representations of the trajectories based on the identified common route elements.

In some embodiments, the device 700 further comprises a map gridding module configured to partition the map into a plurality of grids; a common grid identifying module configured to identify common grids from the plurality of grids, each of the common grids at least covering the predetermined number of the trajectories; and a grid aggregating module configured to aggregate the identified common grids according to an adjacency of the plurality of grids to identify the common route elements.

In some embodiments, the device 700 further comprises a popularity computing module configured to compute, for a grid, a trajectory popularity based on the number of trajectories passing through the grid. In such embodiments, the common grid identifying module is configured to identify the grid as one of the common grids if the trajectory popularity is greater than the predetermined number.

In some embodiments, the route element identifying module 720 is further configured to identify individual route elements for the trajectories based on the set of points, each of the individual route elements representing a geospatial area in which less than the predetermined number of the trajectories are identical. In some embodiments, the simplified representation generating module is configured to generate the simplified representations based on the identified common route elements and the individual route elements.

In some embodiments, the device 700 further comprises: a pattern mining module configured to determine a pattern of the trajectories by clustering the trajectories based on the simplified representations.

In some embodiments, the trajectory obtaining module 710 is further configured to obtain a new trajectory represented by a new set of points on the map. In such embodiments, the device 700 may further comprise: a route element updating module configured to update the common route elements based on the new set of points; and a representation updating module configured to update the simplified representations based on the updated common route elements. In some embodiments, the route element updating module is configured to incrementally update the common route elements. In the incremental update, in response to determining that a first portion of the new trajectory is covered by at least one common route element, the first portion is represented with the at least one common route element. In response to determining that a second portion of the new trajectory is covered by none of the common route elements, the route element updating module attempts to generate a new common route element to represent the second portion. If no new common route element can be generated in association with the second portion, then a new individual route element may be generated to represent the second portion.

For the sake of clarity, FIG. 7 does not show optional modules included in the device 700. It is to be understood that all features as described above with reference to FIG. 1 to FIG. 6 apply to the device 700. Moreover, partitioning of modules in the device 700 is merely for the purpose of illustration without suggesting any limitation as to the scope of the present invention. It is also to be understood that the modules included in the device 700 may be implemented by various manners, including software, hardware, firmware or any combination thereof. For example, in some embodiments, one or more of the modules may be implemented by software and/or firmware. Alternatively, or in addition, one or more of the modules may be implemented by hardware such as an integrated circuit (IC) chip, an application-specific integrated circuit (ASIC), a system on chip (SOC), a field programmable gate array (FPGA), or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining, by one or more processors, trajectories represented by a set of points on a map;
    identifying, by one or more processors, common route elements for the trajectories based on the set of points, each of the common route elements representing a geospatial area in which at least a predetermined number of the trajectories are identical;
    generating, by one or more processors, simplified representations of the trajectories based on the identified common route elements;
    obtaining, by one or more processors, a new trajectory represented by a new set of points on the map;
    updating, by one or more processors, the common route elements based on the new set of points, wherein updating the common route elements comprises incrementally updating the common route elements by:
        in response to determining that a first portion of the new trajectory is covered by at least one common route element, representing the first portion with the at least one common route element;
        in response to determining that a second portion of the new trajectory is covered by none of the common route elements, generating a new common route element to represent the second portion, and
        in response to failing to generate the new common route element, generating a new individual route element to represent the second portion; and
    updating, by one or more processors, the simplified representations based on the updated common route elements.

2. The method of claim 1, wherein identifying the common route elements for the trajectories further comprises:

partitioning the map into a plurality of grids;
identifying common grids from the plurality of grids, each of the common grids at least covering the predetermined number of the trajectories; and
aggregating the identified common grids according to an adjacency of the plurality of grids to identify the common route elements.

3. The method of claim 2, wherein identifying the common grids further comprises:
computing, for a grid, a trajectory popularity based on the number of trajectories passing through the grid; and
identifying the grid as one of the common grids if the trajectory popularity is greater than the predetermined number.

4. The method of claim 1, further comprising:
identifying individual route elements for the trajectories based on the set of points, each of the individual route elements representing a geospatial area in which less than the predetermined number of the trajectories are identical.

5. The method of claim 4, wherein generating the simplified representations comprises:
generating the simplified representations based on the common route elements and the individual route elements.

6. The method of claim 1, further comprising:
determining a pattern of the trajectories by clustering the trajectories based on the simplified representations.

7. A computer program product comprising:
a computer readable storage medium and program instructions stored on the computer readable storage medium, the program instructions comprising:
program instructions to obtain trajectories represented by a set of points on a map;
program instructions to identify common route elements for the trajectories based on the set of points, each of the common route elements representing a geospatial area in which at least a predetermined number of the trajectories are identical;
program instructions to generate simplified representations of the trajectories based on the identified common route elements;
program instructions to obtain a new trajectory represented by a new set of points on the map;
program instructions to update the common route elements based on the new set of points, wherein updating the common route elements comprises incrementally updating the common route elements by:
in response to determining that a first portion of the new trajectory is covered by at least one common route element, program instructions to represent the first portion with the at least one common route element;
in response to determining that a second portion of the new trajectory is covered by none of the common route elements, program instructions to generate a new common route element to represent the second portion; and
in response to failing to generate the new common route element, generating a new individual route element to represent the second portion; and
updating, by one or more processors, the simplified representations based on the updated common route elements.

8. The computer program product of claim 7, wherein the program instructions to identify the common route elements for the trajectories further comprise:

program instructions to partition the map into a plurality of grids;
program instructions to identify common grids from the plurality of grids, each of the common grids at least covering the predetermined number of the trajectories; and
program instructions to aggregate the identified common grids according to an adjacency of the plurality of grids to identify the common route elements.

9. The computer program product of claim 8, wherein the program instructions to identify the common grids further comprise:
program instructions to compute, for a grid, a trajectory popularity based on the number of trajectories passing through the grid; and
program instructions to identify the grid as one of the common grids if the trajectory popularity is greater than the predetermined number.

10. The computer program product of claim 7, the program instructions further comprising:
program instructions to identify individual route elements for the trajectories based on the set of points, each of the individual route elements representing a geospatial area in which less than the predetermined number of the trajectories are identical.

11. The computer program product of claim 10, wherein the program instructions to generate the simplified representations comprise:
program instructions to generate the simplified representations based on the common route elements and the individual route elements.

12. The computer program product of claim 7, the program instructions further comprising:
program instructions to determine a pattern of the trajectories by clustering the trajectories based on the simplified representations.

13. A computer system comprising:
one or more computer processors;
one or more computer readable storage media;
program instructions stored on the one or more computer readable storage media for execution by at least one of the one or more processors, the one or more processors configures to execute the program instructions comprising:
program instructions to obtain trajectories represented by a set of points on a map;
program instructions to identify common route elements for the trajectories based on the set of points, each of the common route elements representing a geospatial area in which at least a predetermined number of the trajectories are identical;
program instructions to generate simplified representations of the trajectories based on the identified common route elements;
program instructions to obtain a new trajectory represented by a new set of points on the map;
program instructions to update the common route elements based on the new set of points, wherein updating the common route elements comprises incrementally updating the common route elements by:
in response to determining that a first portion of the new trajectory is covered by at least one common route element, program instructions to represent the first portion with the at least one common route element;
in response to determining that a second portion of the new trajectory is covered by none of the common route elements, program instructions to generate a new common route element to represent the second portion; and in response to failing to generate the new common route element, generating a new individual route element to represent the second portion; and updating, by one or more processors, the simplified representations based on the updated common route elements.

14. The computer system of claim 13, wherein the program instructions to identify the common route elements for the trajectories further comprise:

program instructions to partition the map into a plurality of grids;

program instructions to identify common grids from the plurality of grids, each of the common grids at least covering the predetermined number of the trajectories; and program instructions to aggregate the identified common grids according to an adjacency of the plurality of grids to identify the common route elements.

15. The computer system of claim 14, wherein the program instructions to identify the common grids further comprise:

program instructions to compute, for a grid, a trajectory popularity based on the number of trajectories passing through the grid; and program instructions to identify the grid as one of the common grids if the trajectory popularity is greater than the predetermined number.

16. The computer system of claim 13, the program instructions further comprising:

program instructions to identify individual route elements for the trajectories based on the set of points, each of the individual route elements representing a geospatial area in which less than the predetermined number of the trajectories are identical.

17. The computer system of claim 16, wherein the program instructions to generate the simplified representations comprise:

program instructions to generate the simplified representations based on the common route elements and the individual route elements.

18. The computer system of claim 13, the program instructions further comprising: program instructions to determine a pattern of the trajectories by clustering the trajectories based on the simplified representations.

* * * * *